(12) United States Patent
Saigusa et al.

(10) Patent No.: US 11,233,430 B2
(45) Date of Patent: Jan. 25, 2022

(54) ROTOR OF SYNCHRONOUS MOTOR WITH REINFORCEMENT MEMBER FOR PRESSING MAGNET

(71) Applicant: Fanuc Corporation, Yamanashi (JP)

(72) Inventors: Katsuhiro Saigusa, Yamanashi (JP); Takafumi Kajiya, Yamanashi (JP); Kenji Kawai, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 82 days.

(21) Appl. No.: 16/703,215

(22) Filed: Dec. 4, 2019

(65) Prior Publication Data

US 2020/0185989 A1 Jun. 11, 2020

(30) Foreign Application Priority Data

Dec. 7, 2018 (JP) .............................. JP2018-230265

(51) Int. Cl.
*H02K 1/27* (2006.01)
*H02K 1/28* (2006.01)
*H02K 29/03* (2006.01)

(52) U.S. Cl.
CPC ............... *H02K 1/278* (2013.01); *H02K 1/28* (2013.01); *H02K 29/03* (2013.01)

(58) Field of Classification Search
CPC .......... H02K 1/278; H02K 1/28; H02K 29/03; H02K 1/2753; H02K 1/276
See application file for complete search history.

(56) References Cited

U.S. PATENT DOCUMENTS

| 8,729,760 B2 | 5/2014 | Kobayashi et al. | |
| 10,439,460 B2 | 10/2019 | Nishifukumoto | |
| 2013/0214620 A1* | 8/2013 | Kobayashi | H02K 15/02 310/43 |
| 2015/0188369 A1* | 7/2015 | Arimatsu | H02K 1/278 310/156.28 |

FOREIGN PATENT DOCUMENTS

| JP | 64-081634 A | 3/1989 |
| JP | 2013165548 A | 8/2013 |
| JP | 2013169103 A | 8/2013 |
| JP | 2017131060 A | 7/2017 |
| JP | 2017-195751 A | 10/2017 |
| JP | 2017-225316 A | 12/2017 |

* cited by examiner

*Primary Examiner* — Thomas Truong
(74) *Attorney, Agent, or Firm* — RatnerPrestia (57) ABSTRACT

A rotor of a synchronous motor is provided with a plurality of magnets fixed to an outer circumferential surface of a rotor core, and a reinforcement member having a cylindrical shape. An interposition member is disposed between the magnet and the reinforcement member. The magnet includes an outer circumferential surface whose center portion in the circumferential direction bulges outward. The interposition member is formed so as to cover the entire outer circumferential surface of the magnet. An outer circumferential surface of the interposition member has a circular shape when cutting along a plane perpendicular to a rotation axis, and is in close contact with an inner circumferential surface of the reinforcement member.

4 Claims, 4 Drawing Sheets

ROTOR OF SYNCHRONOUS MOTOR WITH REINFORCEMENT MEMBER FOR PRESSING MAGNET

CROSS-REFERENCE TO RELATED APPLICATIONS

This application is a new U.S. Patent Application that claims benefit of Japanese Patent Application No. 2018-230265, dated Dec. 7, 2018, the disclosure of this application is being incorporated herein by reference in its entirety for all purposes.

BACKGROUND OF THE INVENTION

1. Field of the Invention

The present invention relates to a rotor of a synchronous motor with a reinforcement member for pressing a magnet.

2. Description of the Related Art

A synchronous motor is provided with a rotor rotating about a rotation axis and a stator disposed around the rotor. It is known that rotors of synchronous motors include a rotor in which rotor cores constituting a yoke and permanent magnets are arranged alternately in the circumferential direction, and a rotor in which permanent magnets are embedded in the rotor core. Further, a surface magnet type rotor in which a plurality of permanent magnets are circumferentially disposed on an outer circumferential surface of a rotor core is known.

In a surface magnet type rotor, when the rotor rotates, a radial outward force acts on the permanent magnet. For example, the centrifugal force due to the rotation of the rotor and the magnetic attraction force due to the magnetic field generated by the stator act outward in the radial direction of the rotor. For this reason, it is necessary to fix the permanent magnet to the rotor core so that the permanent magnet does not come off the rotor core even when a radial force acts on the permanent magnet for a long time.

In the related art, there is known a synchronous motor formed such that a permanent magnet fixed to the surface of a rotor core is fixed from the outside by a cylindrical member (See, for example, Japanese Unexamined Patent Publication No. 2017-225316A, Japanese Unexamined Patent Publication No. 564-81634A, and Japanese Unexamined Patent Publication No. 2017-195751A).

SUMMARY OF THE INVENTION

In a synchronous motor provided with a permanent magnet, torque pulsation may occur depending on the position of the slot of the stator core facing the outer circumferential surface of the rotor. Such torque pulsation is referred to as cogging torque. Cogging torque is preferably reduced because it may prevent smooth rotation of the rotor or may cause noise or vibration to occur.

In order to reduce the cogging torque, a method in which the shape of the surface of the rotor facing the stator is adjusted is known. For example, in the surface magnet type rotor, each magnet can be formed so that the thickness of the center portion in the circumferential direction is larger than the thickness of the end portion in the circumferential direction. That is, the magnet can be formed such that the diameter of the outer circumferential surface in the center portion of the magnet is larger than the diameter of the outer circumferential surface in the end portion. The magnet has a shape in which a center portion in the circumferential direction bulges outward.

Even in a rotor in which a magnet having a bulged center portion is disposed, the magnet can be pressed by a cylindrical member. However, since the outer circumferential surface of the magnet is not circular in the cross section, the cylindrical member is deformed into a shape along the outer circumferential surface of the magnet. Therefore, there is a problem that the force for pressing the magnet is weaker than that of the rotor including the magnet having a circular shape of the outer circumferential surface in the cross section. In particular, in a synchronous motor in which a rotor rotates at a high speed, there is a case where the magnet comes off the rotor core because the centrifugal force of the magnet is increased. As a result, the position of the magnet with respect to the rotor core may shift.

The inner diameter of the cylindrical member for fixing the magnet is set according to the diameter of the center portion and the diameter of the end portion of the magnet. In order to secure the strength of the cylindrical member, the range in which the inner diameter of the cylindrical member can be widened is limited. Meanwhile, the dimensions of the shaft, the rotor core, and the magnets include manufacturing errors. For this reason, when the error obtained by adding an error of the shaft, an error of the rotor core, and an error of the magnet is large toward the positive side, the inner diameter of the cylindrical member may exceed a limit for being widened, and the strength of the cylindrical member may be lowered.

Alternatively, when the error obtained by adding an error of the shaft, an error of the rotor core, and an error of the magnet is small toward the minus side (the absolute value is large), a sufficient pressing force may not be applied to the magnet. As a result, the magnet may come off the rotor core when the rotor is rotating. Alternatively, when an error obtained by adding an error of the shaft, an error of the rotor core, and an error of the magnet are taken into consideration, a tolerance at the time of design becomes small, and it may be sometimes difficult to manufacture a magnet or the like.

A rotor of a synchronous motor according to one aspect of the present disclosure is provided with a rotor core that rotates about a rotation axis, a plurality of permanent magnets fixed to an outer circumferential surface of the rotor core, and a reinforcement member having a cylindrical shape formed so as to press the permanent magnets toward the rotor core. An interposition member is disposed between the permanent magnet and the reinforcement member. The permanent magnet includes an outer circumferential surface, the center portion of which bulges outward with respect to a circle centered on the rotation axis when cutting along a plane perpendicular to the rotation axis. The interposition member is formed so as to cover the entire outer circumferential surface of the permanent magnet. The outer circumferential surface of the interposition member is formed to extend along a circle centered on the rotation axis when cutting along a plane perpendicular to the rotation axis, and is in close contact with an inner circumferential surface of the reinforcement member.

DETAILED DESCRIPTION

A rotor of a synchronous motor according to embodiments will be described with reference to FIGS. 1 to 6. The synchronous motor includes a stator and a rotor disposed inside the stator. The stator is formed, for example, by laminating a plurality of electromagnetic steel plates in a direction in which a shaft extends. A plurality of coils are arranged in the circumferential direction of the stator. The synchronous motor of the present embodiment is disposed inside a spindle head of a machine tool so as to rotate the spindle of the machine tool. The rotor of the synchronous motor according to the present embodiment is a surface magnet type rotor in which permanent magnets are disposed on the surface of the rotor core.

Figure 1:
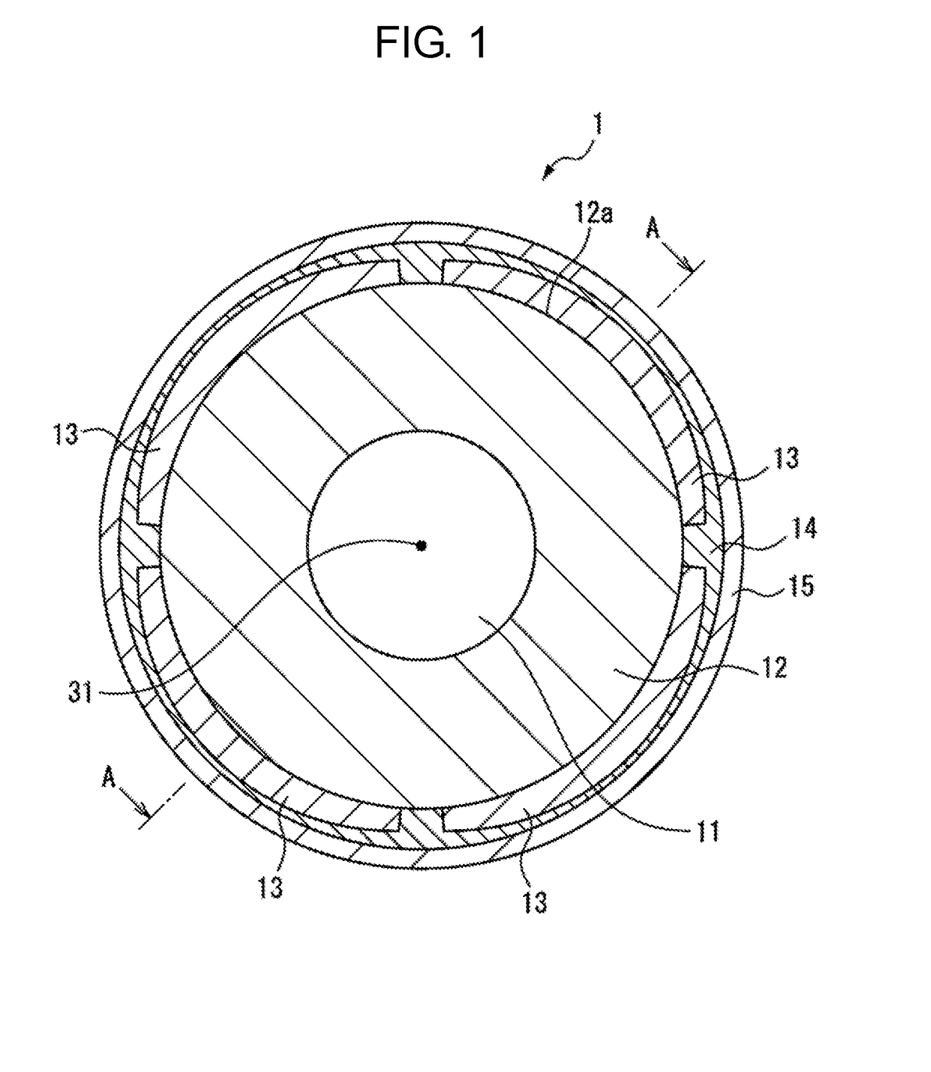
FIG. 1 is a cross-sectional view of a first rotor according to an embodiment when cutting along a plane perpendicular to a rotation axis.
Figure 2:
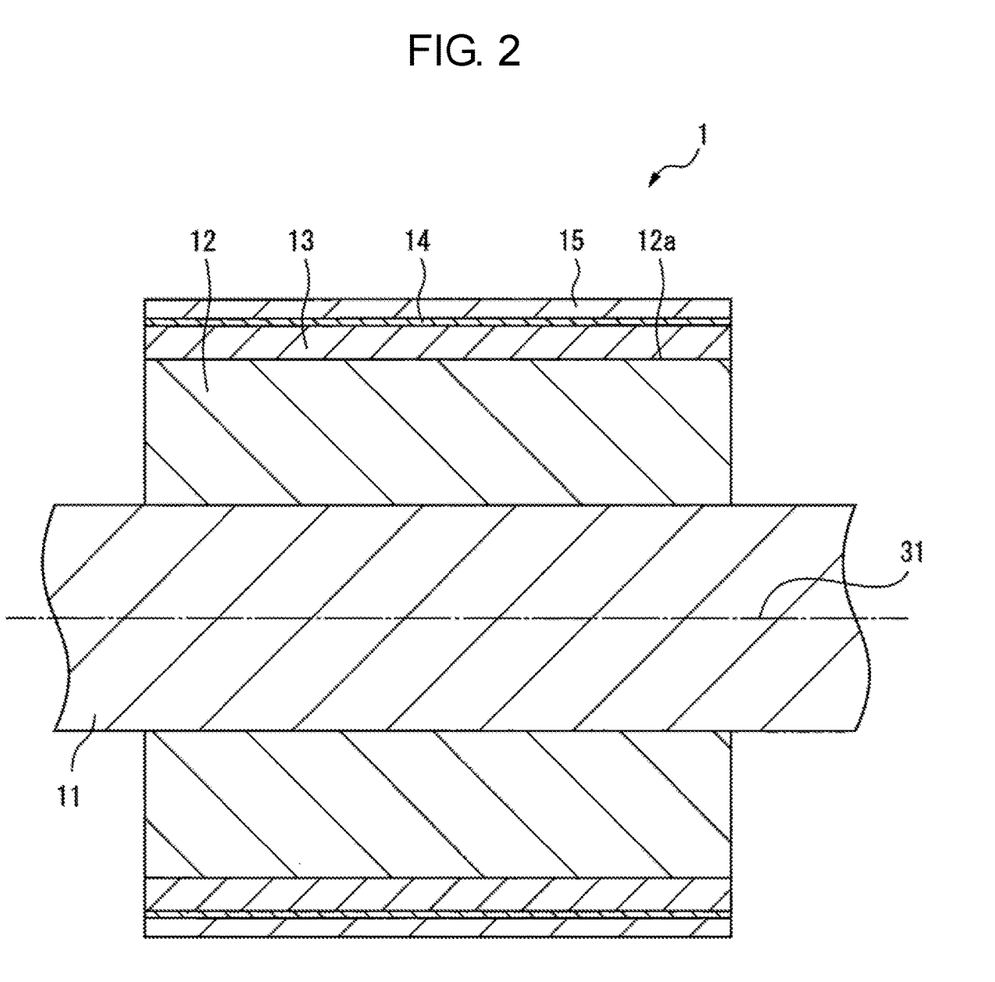
FIG. 2 is a cross-sectional view of the first rotor when cutting along a plane parallel to the rotation axis.

FIG. 1 is a cross-sectional view of a first rotor according to a present embodiment when cutting along a plane perpendicular to a rotation axis. FIG. 2 is a cross-sectional view of the first rotor according to the present embodiment when cutting along a plane parallel to the rotation axis. FIG. 2 is a cross-sectional view when cutting along line A-A in FIG. 1. Referring to FIG. 1 and FIG. 2, a first rotor 1 includes a shaft 11 that rotates about a rotation axis 31. The shaft 11 is formed in a columnar shape.

The rotor 1 includes a rotor core 12 fixed to the shaft 11. The rotor core 12 according to the present embodiment has a cylindrical shape. The rotor core 12 rotates about the rotation axis 31. The rotor core 12 includes an outer circumferential surface 12a having a circular shape when cutting along a plane perpendicular to the rotation axis 31. The rotor core 12 is formed, for example, by stacking a plurality of electromagnetic steel sheets in the direction of the rotation axis 31. Alternatively, the rotor core 12 can be formed of a single member. For example, the rotor core 12 can be formed by cutting a magnetic member such as iron. The rotor core 12 is fixed to the shaft 11. Additionally, the rotor core may include the shaft. That is, the shaft 11 and the rotor core 12 in the present embodiment may be integrally formed of one member.

The rotor 1 has a plurality of magnets 13 fixed on the outer circumferential surface 12a of the rotor core 12. The magnet 13 according to the present embodiment is a permanent magnet formed in a plate shape. The plurality of magnets 13 are disposed at equal intervals along the circumferential direction. The number of magnets 13 depends on the number of poles of the rotor 1. Depending on the number of poles of the rotor, any number of magnets can be fixed to the rotor core. In the example illustrated in FIG. 1, a four-pole rotor in which four magnets 13 are disposed is depicted. The magnets 13 illustrated in FIG. 1 and FIG. 2 extend from one axial end of the rotor core 12 to the other. The shape of the magnet 13 is not limited to this configuration, and a plurality of magnets may be arranged in the extending direction of the rotation axis 31. For example, a group of two magnets arranged in the direction of the rotation axis 31 may be formed, and a plurality of groups may be arranged in the circumferential direction.

The rotor 1 according to the present embodiment includes a reinforcement member 15 formed to press the magnet 13 toward the rotor core 12. The reinforcement member 15 according to the present embodiment presses the magnet 13 toward the rotation axis 31. The reinforcement member 15 has a cylindrical shape. An interposition member 14 is disposed between the magnet 13 and the reinforcement member 15. At least a portion of the interposition member 14 according to the present embodiment is disposed between the magnet 13 and the reinforcement member 15. The interposition member 14 is formed so as to cover all of the plurality of magnets 13. The reinforcement member 15 is formed so as to cover the interposition member 14. The reinforcement member 15 is formed so as to press the interposition member 14 toward the rotation axis 31. That is, a compressive force is applied to the interposition member 14 by the reinforcement member 15. The magnet 13 is pressed toward the rotation axis 31 by the interposition member 14.

The reinforcement member 15 according to the present embodiment is formed of a fiber reinforced plastic (FRP). The fiber reinforced plastic includes a carbon fiber reinforced plastic (CFRP) in which carbon fibers are added to a plastic as a reinforcing material, or a glass fiber reinforced plastic (GFRP) in which glass fibers are added to a plastic as a reinforcing material.

Figure 3:
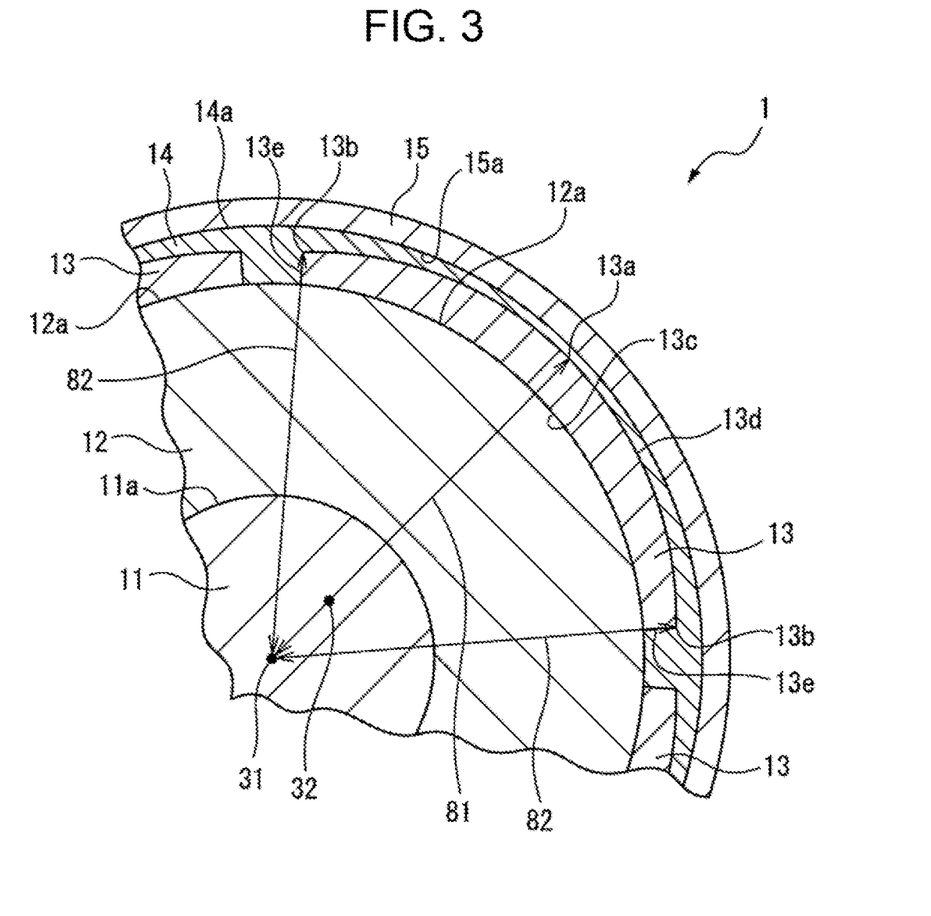
FIG. 3 is an enlarged cross-sectional view of a portion in which magnets of the first rotor are disposed.

FIG. 3 is an enlarged cross-sectional view of a portion of the magnet of the first rotor according to the present embodiment. FIG. 3 is a cross-sectional view when cutting along a plane perpendicular to the rotation axis 31. Referring to FIG. 1 to FIG. 3, the magnet 13 includes a center portion 13a in the circumferential direction and end portions 13b on both sides in the circumferential direction. The magnet 13 includes an inner circumferential surface 13c, which is a radially inside surface of the rotor 1, and an outer circumferential surface 13d, which is a radially outside surface. The inner circumferential surface 13c is fixed to the outer circumferential surface 12a of the rotor core 12. The magnet 13 includes end surfaces 13e on both sides in the circumferential direction. Here, the center portion 13a indicates the position of the midpoint of the circumferential length between the end surfaces 13e on both sides.

The inner circumferential surface 13c of the magnet 13 has a shape which, when cutting along a plane perpendicular to the rotation axis 31, extends along a circle centered on the rotation axis 31. The radius from the rotation axis 31 to the inner circumferential surface 13c in the center portion 13a is the same as the radius from the rotation axis 31 to the inner circumferential surface 13c in the end portion 13b. The inner circumferential surface 13c of the magnet 13 is in close contact with the outer circumferential surface 12a of the rotor core 12.

On the other hand, the outer circumferential surface 13d of the magnet 13 has a shape in which the center portion 13a bulges outward with respect to a circle centered on the rotation axis 31. The radius from the rotation axis 31 to the outer circumferential surface 13d in the center portion 13a illustrated by the arrow 81 is larger than the radius from the rotation axis 31 to the outer circumferential surface 13d in the end portion 13b illustrated by the arrow 82. In other words, the center portion 13a of the magnet 13 corresponds to a long diameter portion. The end portion 13b of the magnet 13 corresponds to a short diameter portion. The thickness of the magnet 13 in the center portion 13a is greater than the thickness in the end portion 13b.

The shape of the outer circumferential surface 13d in which the center portion 13a bulges outward as such can be set by any method. In the present embodiment, the outer circumferential surface 13d has an arc shape when cutting along a plane perpendicular to the rotation axis 31. The shape of the outer circumferential surface 13d is determined by shifting the center of the arc of the outer circumferential surface 13d from the rotation axis 31. In the cross-sectional shape, the center of the arc of the inner circumferential surface 13c is the rotation axis 31. On the other hand, the center of the arc of the outer circumferential surface 13d is a point 32 shifted outward from the rotation axis 31. As described above, in the present embodiment, the curvature of the inner circumferential surface 13c is formed such as to be different from the curvature of the outer circumferential surface 13d. In the present embodiment, the radius of curvature of the outer circumferential surface 13d is formed so as to be smaller than the radius of curvature of the inner circumferential surface 13c. In addition to the above, for example, the cross-sectional shape of the outer circumferential surface 13d can be set by using a function such as a hyperbolic cosine function.

The interposition member 14 in the present embodiment is formed so as to cover at least the outer circumferential surface 13d of the magnet 13. The interposition member 14 is formed so as to cover the entire outer circumferential surface 13d of the magnet 13. That is, the interposition member 14 is formed so as to cover the center portion 13a and the end portion 13b, which have different diameters for the outer circumferential surface 13d from the rotation axis 31.

In the first rotor 1, the interposition member 14 is disposed in region between the outer circumferential surface 13d of the magnet 13 and the inner circumferential surface 15a of the reinforcement member 15, and in region between the magnets 13 that are adjacent each other in the circumferential direction. The interposition member 14 is formed so as to fill the entire region surrounded by the outer circumferential surface 12a of the rotor core 12, the inner circumferential surface 15a of the reinforcement member 15, and the outer circumferential surface 13d and the end surface 13e of the magnet 13. Therefore, the thickness of the interposition member 14 on the end portion 13b of the magnet 13 is greater than the thickness of the interposition member 14 on the center portion 13a. The outer circumferential surface 14a of the interposition member 14 is formed so as to follow along a circle centered on the rotation axis 31 when cutting along a plane perpendicular to the rotation axis 31. In particular, the outer circumferential surface 14a of the interposition member 14 is formed so as to be concentric with the outer circumferential surface 12a of the rotor core 12. The interposition member 14 extends from one end surface of the rotor core to the other end surface along the direction in which the rotation axis 31 extends.

The interposition member 14 can be formed of a non-magnetic material. The interposition member 14 according to the present embodiment is formed of a resin. For example, the interposition member 14 can be formed of an epoxy resin. The interposition member 14 can be formed of a ceramic or a non-magnetic metal in addition to a resin.

The outer circumferential surface 14a of the interposition member 14 according to the present embodiment is formed so as to have a circular cross-sectional shape when cutting along a surface perpendicular to the rotation axis 31. Although the thickness of the magnet 13 is not constant along the circumferential direction, the magnet 13 can be pressed by the same force as when the cross-sectional shape of the outer circumferential surface 13d of the magnet is a circle. In other words, even if the thickness of the magnet 13 is not constant along the circumferential direction, the pressing force does not decrease.

For example, when the interposition member 14 is not present, the magnet 13 contacts the reinforcement member 15. The reinforcement member 15 is deformed into a shape along the outer circumferential surface 13d of the magnet 13, and the pressing force against the magnet 13 is reduced as compared with the case where the cross-sectional shape of the outer circumferential surface 13d of the magnet 13 is a circle. Therefore, when the rotor 1 rotates and a centrifugal force acts, the magnet 13 tends to come off the rotor core 12 at the end portion 13b. As a result, the magnet 13 may be separated from the rotor core 12 and the position of the magnet 13 relative to the rotor core 12 may shift. However, in the present embodiment, the magnet 13 can be pressed by the same pressing force as in the case where the cross-sectional shape of the outer circumferential surface 13d of the magnet 13 is a circle, and the detachment of the magnet 13 from the rotor core 12 can be effectively suppressed.

In particular, in a synchronous motor in which the rotor 1 rotates at a high speed, the centrifugal force increases. The centrifugal force increases in proportion to the square of the rotational speed. For this reason, when the rotor 1 rotates at a high speed, the magnet 13 tends to come off the rotor core 12. However, in the rotor 1 according to the present embodiment, since the magnet 13 can be sufficiently pressed against the rotor core 12, peeling of the magnet 13 can be suppressed. The rotational speed of the synchronous motor at a high speed may be exemplified by 10,000 rpm or more, for example. The synchronous motor according to the present embodiment is a motor for rotating the spindle of the machine tool, and rotates at a high speed. The rotor 1 according to the present embodiment is suitable for a synchronous motor in which such a shaft 11 rotates at a high speed.

Figure 4:
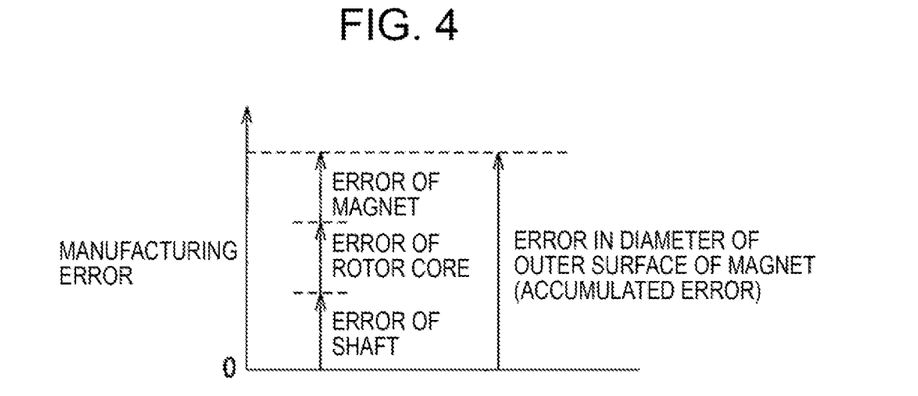
FIG. 4 is a diagram for explaining an accumulated error with respect to a radial dimension of the rotor.

FIG. 4 is a diagram for explaining a manufacturing error. Each member is manufactured so as to have dimensions within tolerances set at the time of design. The manufacturing error may cause an increase or a decrease in the overall dimension. FIG. 4 illustrates a case where the overall dimension may increase. In the rotor 1 according to the present embodiment, dimensional errors occur when the shaft 11 is manufactured. For example, an error occurs in the diameter of the outer circumferential surface 11a of the shaft 11. Further, when the rotor core 12 is manufactured, an error occurs in the diameter of the outer circumferential surface 12a of the rotor core 12. Further, an error occurs in the thickness when the magnet 13 is manufactured. The error in the diameter (radius from the rotation axis 31 to the outer circumferential surface 13d) of the outer circumferential surface 13d of the magnet 13 is a value obtained by adding the error in the diameter of the outer circumferential surface 11a of the shaft 11, the error in the diameter of the outer circumferential surface 12a of the rotor core 12, and the error in the thickness of the magnet 13. When the error of the shaft 11 is large toward the positive side, the error of the rotor core 12 is large toward the positive side, and the error of the thickness of the magnet 13 is large toward the positive side, the error of the diameter of the outer circumferential surface 13d of the magnet 13 becomes very large. That is, the accumulated error becomes large.

In the present embodiment, as will be described later, after the interposition member 14 is formed on the outer circumferential surface 13d of the magnet 13, the reinforcement member 15 whose inner diameter is set according to the diameter of the outer circumferential surface 14a of the interposition member 14 is mounted on the outer circumferential surface 14a.

In the rotor without the interposition member 14, the inner diameter of the reinforcement member is set so that a necessary pressing force can be supplied in accordance with the diameter of the outer circumferential surface 13d in the end portion 13b of the magnet 13 and the diameter of the outer circumferential surface 13d in the center portion 13a. For example, an inner diameter of the reinforcement member that can supply a necessary pressing force to the outer circumferential surface having a diameter between the diameter of the outer circumferential surface 13d in the end portion 13b and the diameter of the outer circumferential surface 13d in the center portion 13a can be adopted. However, when the diameter of the reinforcement member 15 is increased, there is a limit to the amount of expansion. For example, a reinforcement member formed of a fiber reinforced plastic has a range in which the inner diameter can be increased. When the accumulated error is large, the inner diameter may exceed the range in which the inner diameter can be increased, whereby the strength of the reinforcement member 15 may be lowered.

Alternatively, when the error of the shaft 11 is large toward the negative side, the error of the rotor core 12 is large toward the negative side, and the error of the thickness of the magnet 13 is large toward the negative side, the dimension of the outer circumferential surface 13d of the magnet 13 in the radial direction becomes very small (the absolute value of the error becomes large). Therefore, in the rotor without the interposition member 14, there is a case where the force for pressing the magnet 13 by the reinforcement member 15 becomes weak. As a result, the magnet 13 may be detached from the rotor core 12 when the rotor rotates.

On the other hand, the first rotor 1 according to the present embodiment includes an interposition member 14. The interposition member 14 is formed so as to cover the outer circumferential surface 13d of the magnet 13, and is further formed so that the outer circumferential surface 14a of the interposition member 14 has a circular cross-sectional shape. Therefore, the reinforcement member 15 can press the interposition member 14 and the magnet 13 toward the rotation axis 31 with a force of the same magnitude as that in the case where the cross-sectional shape of the outer circumferential surface 13d of the magnet 13 is a circle.

The interposition member 14 according to the first rotor 1 is formed so as to cover the magnet 13 in the center portion 13a and the end portion 13b. The interposition member 14 is preferably formed thick so as to counteract maximum dimensional errors based on the tolerance of the shaft 11, the tolerance of the rotor core 12, and the tolerance of the magnet 13, in the design. By adopting this configuration, the manufacturing error of the shaft 11, the manufacturing error of the rotor core 12, and the manufacturing error of the magnet 13 can be absorbed in the thickness portion of the interposition member 14.

Further, as will be described later, the interposition member 14 can be formed such that the cross-sectional shape of the outer circumferential surface 14a of the interposition member 14 follows along a circle centered on the rotation axis 31. As a result, it is possible to suppress the force applied to the magnet 13 from being reduced as compared with the case where the cross-sectional shape of the outer circumferential surface 13d of the magnet 13 is a circle. Further, by adjusting the thickness of the interposition member 14 based on the inner diameter of the reinforcement member 15, the pressing force applied to the magnet 13 can be adjusted to an appropriate range.

The reinforcement member 15 according to the present embodiment is formed of a fiber reinforced plastic. By adopting this configuration, the magnet 13 can be fixed by a light and strong reinforcement member. Since the fiber reinforced plastic is light, the centrifugal force when the rotor 1 rotates is reduced. For this reason, the reinforcement member formed of a fiber reinforced plastic is suitable for the rotor 1 which rotates at a high speed.

The material of the reinforcement member is not limited to a material including a resin, and may be formed of a material having no magnetism. For example, the reinforcement member may be formed of a non-magnetic metal. For example, the reinforcement member may be formed of stainless steel or copper having no magnetic property. When the reinforcement member formed of a metal is heated, the inner diameter of the reinforcement member increases. That is, the diameter of the reinforcement member can be easily increased. Next, the rotor core to which the magnet and the interposition member are fixed is disposed inside the reinforcement member. Thereafter, the rotor core can be fixed to the inside of the reinforcement member by cooling the reinforcement member. In this way, the rotor core can be fixed to the inside of the reinforcement member by shrink fitting. The reinforcement member formed of a metal can easily fix the rotor core inside the reinforcement member.

Next, a method of manufacturing a rotor according to the present embodiment will be described. Referring to FIG. 1 and FIG. 3, a plurality of magnets 13 are first fixed to an outer circumferential surface 12a of the rotor core 12. Next, a cylindrical frame member having a shape corresponding to the shape of the reinforcement member 15 is prepared. The inner circumferential surface of the frame member is formed of a material having mold-releasable properties with respect to the resin. The frame member may be formed of a metal, for example.

Next, the rotor core 12 to which the magnet 13 is fixed is inserted into such frame member. Preferably, the inner diameter of the frame member is greater than the inner diameter of the reinforcement member 15. Next, a region surrounded by the frame member, the magnet 13, and the rotor core 12 is filled with a material to be the interposition member 14. In the present embodiment, a resin before curing is caused to flow in. In the method of manufacturing the first rotor 1, the resin is filled without a gap not only in the region between the magnets 13 and the frame member, but also in the region between the magnets 13. Next, the material to be the interposition member 14 is cured. In the present embodiment, the interposition member 14 is formed by curing the resin. The rotor core 12 to which the magnet 13 and the interposition member 14 are fixed can be formed.

Next, the outer circumferential surface 14a of the interposition member 14 is cut so that the cross-sectional shape of the outer circumferential surface 14a of the interposition member 14 becomes a circle centered on the rotation axis 31. At this time, the cutting is performed so that the diameter of the outer circumferential surface 14a of the interposition member 14 is within the tolerance of the design. The cutting is performed such that the diameter of the outer circumferential surface 14a of the interposition member 14 corresponds to the diameter of the inner circumferential surface 15a of the reinforcement member 15. For example, it is possible to cut such that the diameter of the outer circumferential surface 14a of the interposition member 14 is slightly larger than the diameter of the inner circumferential surface 15a of the reinforcement member 15. A machine tool or the like can be used in the cutting process of the interposition member 14.

Next, the reinforcement member 15 is mounted on the outside of the outer circumferential surface 14a of the interposition member 14. At this time, since the diameter of the outer circumferential surface 14a of the interposition member 14 is formed larger than the inner circumferential surface 15a of the reinforcement member 15, the whole of the outer circumferential surface 14a of the interposition member 14 can be pressed. The magnet 13 is pressed by a sufficient force through the interposition member 14.

As described above, the method of manufacturing a rotor according to the present embodiment includes a forming step of forming an interposition member so as to cover at least the entire outer circumferential surface of the permanent magnet, and a cutting step of cutting the outer circumferential surface of the interposition member. In the forming step, the interposition member is formed so that the outer diameter of the interposition member is larger than the inner diameter of the reinforcement member. In the cutting step, the cutting is performed so that the outer circumferential surface of the interposition member becomes a circle centered on the rotation axis when cutting along a plane perpendicular to the rotation axis. According to this manufacturing method, the diameter of the outer circumferential surface of the interposition member can correspond to the inner diameter of the reinforcement member. The accumulated error obtained by adding the error of the shaft 11, the error of the rotor core 12, and the error of the thickness of the magnet 13 can be counteracted by the thickness of the interposition member. As a result, it is possible to suppress the strength of the reinforcement member 15 from being lowered by exceeding the limit of the diameter expansion of the reinforcement member 15 due to a large manufacturing error. Further, it is possible to suppress the pressing force against the magnet 13 from becoming weak. Further, the length in the radial direction to be tightened by the reinforcement member 15 can be set within an appropriate range.

In particular, magnets are difficult to be formed with high dimensional accuracy. In the rotor according to the present embodiment, since the shape of the outer circumferential surface of the interposition member can be adjusted, the design tolerance of the magnet 13 can be set large. As a result, the magnet 13 can be easily manufactured. Alternatively, the manufacturing cost of the rotor 1 can be reduced.

Further, the outer circumferential surface 14a of the interposition member 14 according to the present embodiment can be easily machined with high accuracy by using a machine tool or the like. For this reason, the amount by which the reinforcement member 15 is expanded (radial length for increasing diameter) need not be excessively large. That is, it is not necessary to increase excessively the amount of diameter expansion. Therefore, it is possible to suppress the reinforcement member 15 from being damaged by exceeding the diameter expansion limit of the reinforcement member 15.

In the first rotor 1 according to the present embodiment, the interposition member 14 is disposed in the entire region surrounded by the rotor core 12, the magnet 13, and the reinforcement member 15. The interposition member is not limited to this form, and may be formed so as to cover at least the entire outer circumferential surface of the permanent magnet.

Figure 5:
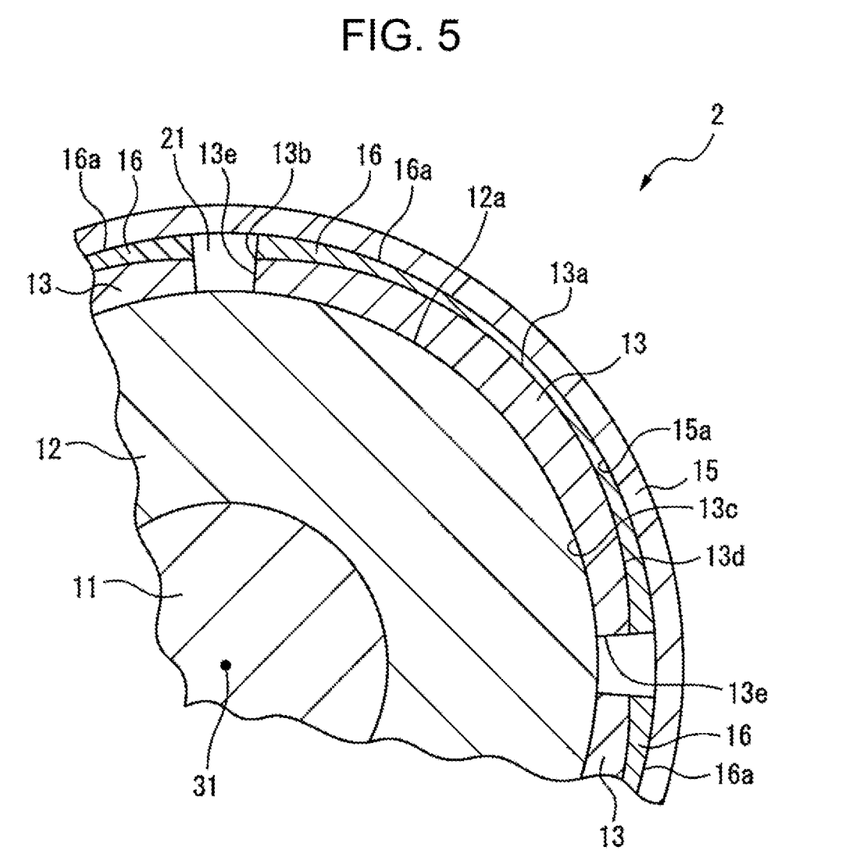
FIG. 5 is an enlarged cross-sectional view of a portion in which magnets of a second rotor according to the embodiment are disposed.

FIG. 5 is an enlarged cross-sectional view of a magnet portion of a second rotor according to the present embodiment. In the second rotor 2, an interposition member 16 is formed for each magnet 13. The interposition member 16 is formed to fill the region between the outer circumferential surface 13d of the magnet 13 and the inner circumferential surface 15a of the reinforcement member 15. A cavity portion 21 is formed between the magnets 13 adjacent in the circumferential direction.

The second rotor 2 can be manufactured by the same manufacturing method as that of the first rotor 1. Also in the manufacturing method of the second rotor 2, the magnet 13 is fixed to the rotor core 12. A rotor core 12 to which a magnet 13 is fixed is disposed inside a frame member that is formed in advance. The frame member for forming the second rotor 2 includes a wall portion formed along the end surface 13e of the magnet 13. A region surrounded by the wall portion, the outer circumferential surface 13d of the magnet 13, and the inner circumferential surface 15a of the reinforcement member 15 is filled with a material serving as an interposition member. For example, a resin is filled. Next, by curing the material serving as the interposition member, the interposition member can be formed for each magnet. For example, by curing the resin, the interposition member 16 can be formed with respect to the magnet 13. Next, the interposition member 16 is cut by a machine tool or the like so that the cross-sectional shape of the outer circumferential surface 16a of the interposition member 16 follows along a circle centered on the rotation axis 31. Next, the rotor core 12 to which the magnet 13 and the interposition member 16 are fixed is fixed to the inside of the reinforcement member 15.

Figure 6:
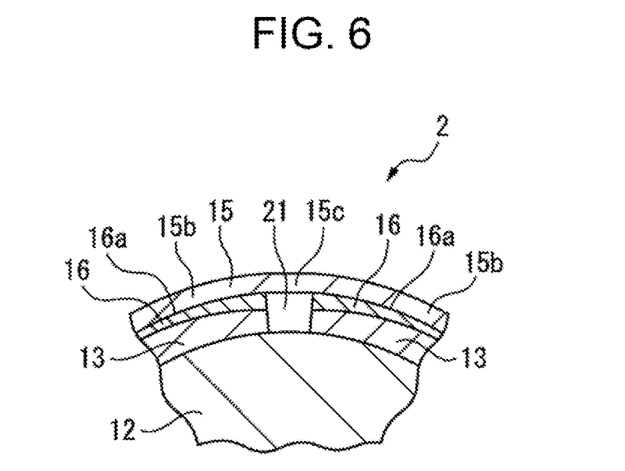
FIG. 6 is an enlarged cross-sectional view of a portion between magnets of the second rotor.

FIG. 6 is an enlarged cross-sectional view illustrating the action of the second rotor according to the present embodiment. In FIG. 6, the radius of curvature of the rotor is smaller than that in FIG. 5 for the purpose of explanation. In the second rotor 2, a cavity portion 21 is formed between the magnets 13. In the region where the interposition member 16 is disposed, the reinforcement member 15 includes a curved portion 15b formed along the outer circumferential surface 16a of the interposition member 16 so as to have an arcuate sectional shape. On the other hand, in the region where the cavity portion 21 is formed, a flat portion 15c extending in a planar shape is formed.

Since stress is generated at the boundary between the curved portion 15b and the flat portion 15c, the second rotor 2 has a characteristic that the strength is lower than that of the first rotor 1. However, in the second rotor 2, as in the case of the first rotor 1, the magnet 13 can be pressed with sufficient force as compared with the case where the interposition member 16 is not provided. The other action and effect of the second rotor 2 are the same as those of the first rotor 1, and therefore the description thereof will not be repeated here.

The electric motor according to the present embodiment is an electric motor that rotates the spindle of a machine tool, but the embodiment is not limited to this, and a rotor according to the present embodiment can be adopted for any electric motor. In particular, as described above, it is suitable for an electric motor having a large rotational speed.

According to one aspect of the present disclosure, it is possible to provide a rotor of a synchronous motor which is easy to be manufactured and which can suppress peeling of a magnet.

In each of the manufacturing steps described above, the order of the steps can be changed as appropriate to the extent that the function and the action are not changed.

The above embodiments may be combined as appropriate. In each of the above figures, the same or equivalent parts are denoted by the same reference numerals. It should be noted that the above embodiment is an example and does not limit the invention. Additionally, the embodiments also include modifications to the embodiments shown in the claims.

The invention claimed is:

1. A rotor of a synchronous motor, comprising:
a rotor core configured to rotate about a rotation axis;
a plurality of permanent magnets fixed to an outer circumferential surface of the rotor core; and
a reinforcement member having a cylindrical shape formed to press the permanent magnets toward the rotor core, wherein the reinforcement member is formed of a fiber reinforced plastic, and wherein
an interposition member is disposed between the permanent magnets and the reinforcement member,
the permanent magnet includes an outer circumferential surface, a center portion of which bulges outward with respect to a circle centered on the rotation axis when cutting along a plane perpendicular to the rotation axis,
the interposition member is formed to cover the entire outer circumferential surface of the permanent magnet, and
an outer circumferential surface of the interposition member is formed to extend along a circle centered on the rotation axis when cutting along a plane perpendicular to the rotation axis, and is in close contact with an inner circumferential surface of the reinforcement member.

2. The rotor of a synchronous motor according to claim 1, wherein
the interposition member is disposed in a region between the outer circumferential surface of the permanent magnet and the inner circumferential surface of the reinforcement member and in a region between the permanent magnets that are circumferentially adjacent, and is disposed in the entire region surrounded by the rotor core, the reinforcement member, and the permanent magnets.

3. The rotor of a synchronous motor according to claim 1, wherein
the interposition member is disposed in a region between the outer circumferential surface of the permanent magnet and the reinforcement member, and
a cavity portion is formed between the permanent magnets that are circumferentially adjacent.

4. The rotor of a synchronous motor according to claim 1, wherein
the interposition member is formed of a resin.

* * * * *